Patented June 13, 1939

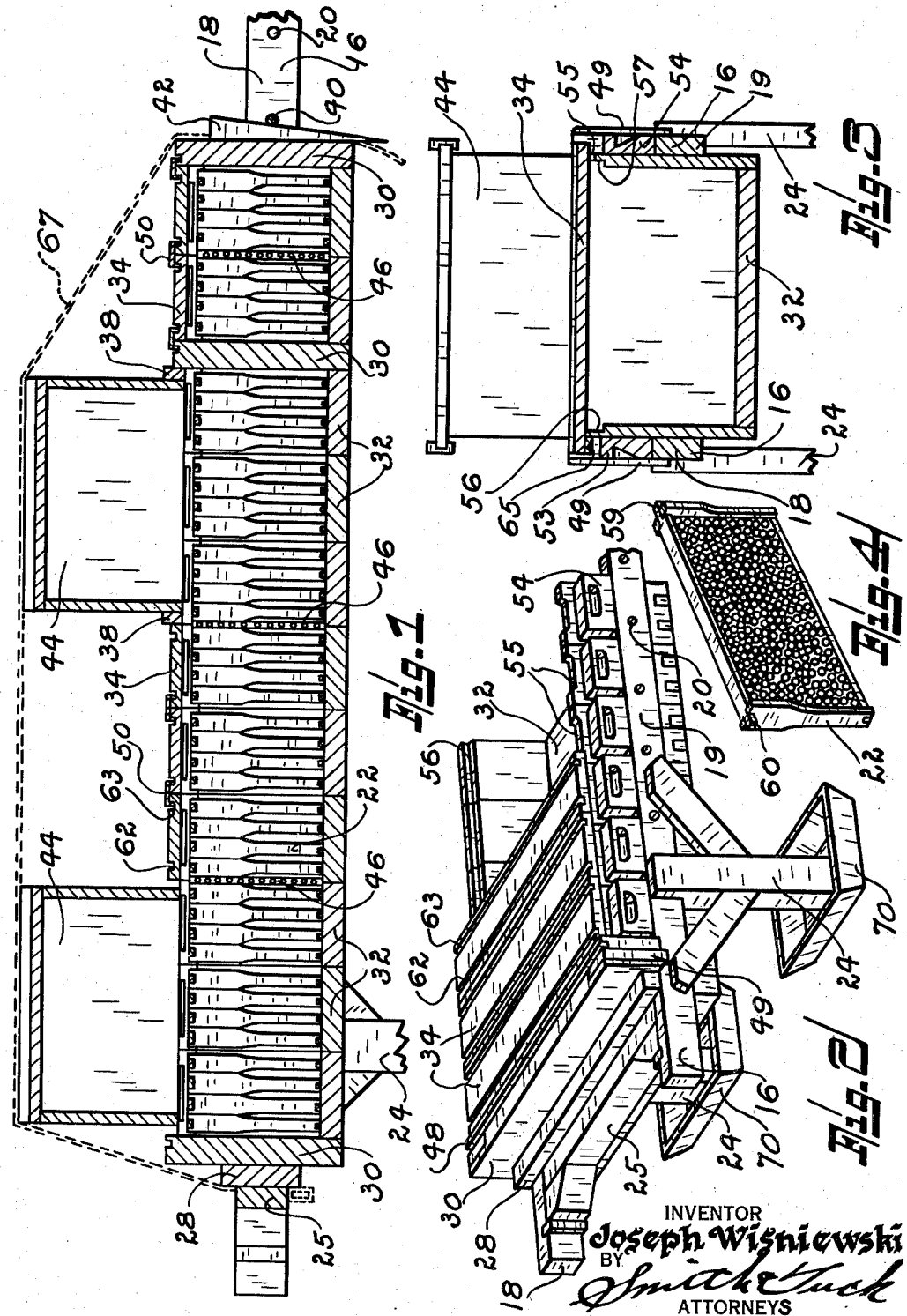

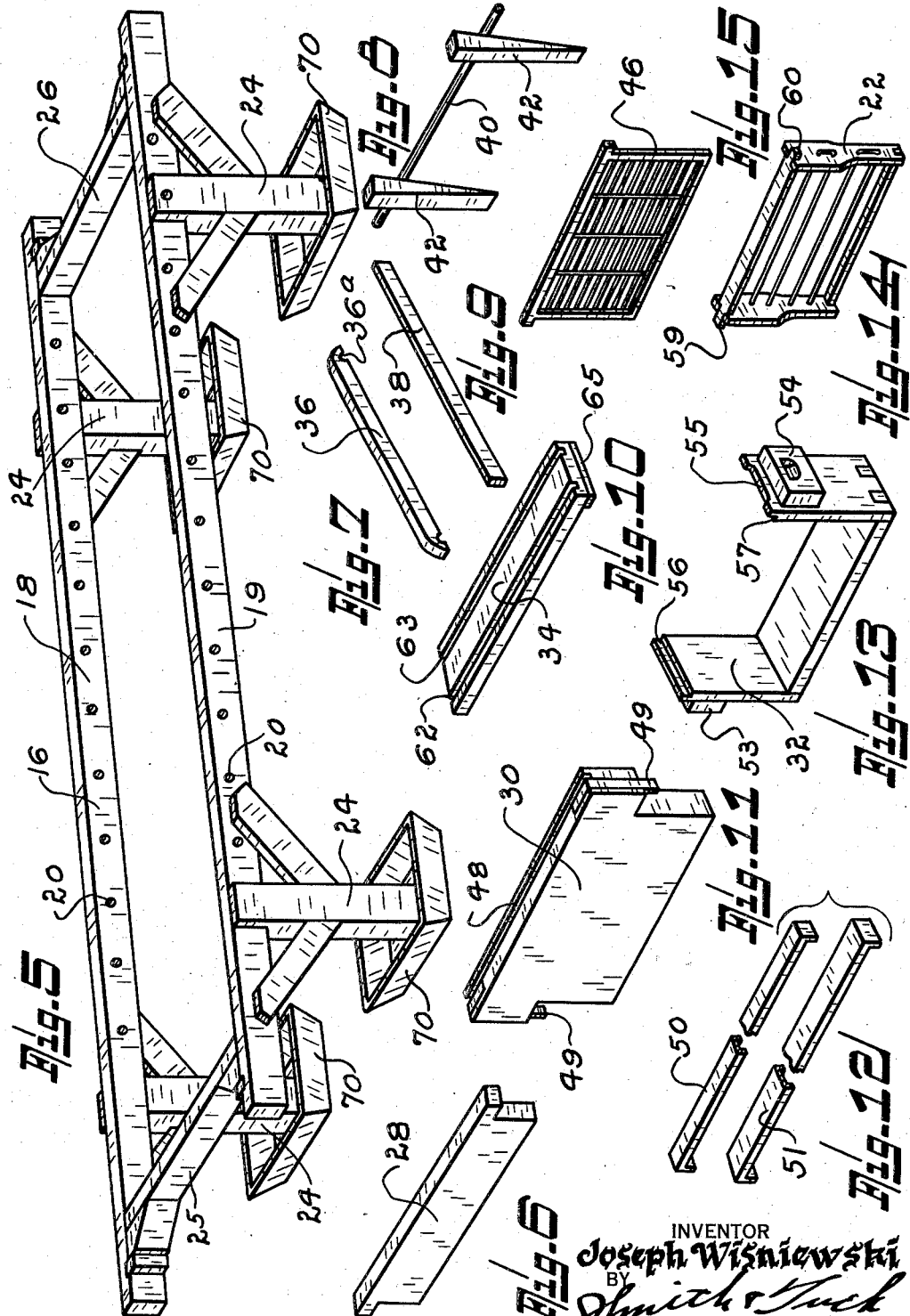

2,162,413

UNITED STATES PATENT OFFICE 2,162,413

SWARM-CONTROLLING SECTION HIVE

Joseph Wisniewski, Mount Vernon, Wash.

Application August 5, 1938, Serial No. 223,309

11 Claims. (Cl. 6—2)

My present invention relates to the art of devices used in bee culture and more particularly to a swarm controlling section-hive.

As is well known to experienced beemen there is a tremendous amount of constant detail, or routine work, associated with the culture of bees. To be successful the condition of the colonies in the various bee hives must be constantly watched and this involves repeated handling of the conventional types of hives such as have been used for many years. They must be taken down for the examination of the brood; the brood frames must be exchanged for empty frames and, in the process of putting back the conventional equipment, a large number of bees are crushed.

With my improved bee hive the work of inspecting the bee colonies is greatly simplified in that it is not necessary to handle heavy hives or to disturb large numbers of bees. With my equipment it is a simple matter to exchange empty frames of combs for brood frames, and to put on the light covers; and the operation is complete.

Even when my improved hive is used in combination with the usual standard hives, the heavy lifting can still be avoided.

Another purpose of my present invention is to overcome the troublesome problem of guarding the bees against spiders, earwigs, and other insects which normally can find entrance into the conventional hives and which the bees are constantly required to fight. In my improved hive arrangement the equipment is very conveniently mounted upon posts, or legs, which can be easily safeguarded against insects, by placing them in pans which may in turn be filled with water so as to prevent inroads of insects.

A further object of my present invention is to assist in the controlling of swarms of bees. The beeman must normally work hard to avoid unnecessary swarming and this is caused to a great extent by the bees, from the upper hives, who must of necessity travel through the brood chamber; this excites all of the bees and swarming is the result. While swarming is a natural happening in the cycle of bee life it is easily controlled with my arrangement in that the entrance to the brood chamber is separated from the entrance to the store hives; further, there is sufficient opening on the side of the chambers to give ample ventilation without draft. These conditions greatly minimize swarming.

Another important object of my invention is to provide a convenient arrangement for caring for the bees during the winter period. As I have my hive arranged it is a very simple matter to cover the top of the section-hive with canvas, tar paper, or the like so as to exclude rain and snow water and, as the bees live in a multiple hive, one colony tends to assist in keeping up the temperature in the neighboring colony. In this way the bees are warmer and as a result come out in the spring stronger and there is no loss of bee colonies. It is also found that they eat less honey. Generally speaking, my improved section-hive is a comfortable home for bees in summer or winter, where they can produce more honey than in the conventional type of hive. It is very well adapted to extracting honey, comb honey, and for queen raising. It provides all the desirable characteristics and at the same time is a very convenient tool for the beeman to work with.

Other and more specific objects will be apparent from the following description taken in connection with the accompanying drawings, wherein Figure 1 is a typical, longitudinal, sectional view in elevation through one form of my section-hive.

Figure 2 is a perspective view showing a portion of my hive to better illustrate the parts involved therein.

Figure 3 is a typical, cross-sectional view through my section-hive.

Figure 4 is a perspective view showing a comb frame filled with combs.

Figure 5 is a perspective view showing the supporting table of my section hive and illustrating further the pans employed to prevent insects from climbing the posts.

Figure 6 is a perspective view showing an end board for use with my hive.

Figure 7 is a type of pry bar found convenient for use with my hive.

Figure 8 is a perspective view showing the wedges and iron separating bars used to press the various sections of my hive into snug engagement with one another.

Figure 9 is a perspective view showing one of the ventilator control boards of which a number are normally used in each hive.

Figure 10 is a perspective view showing a section top.

Figure 11 is a perspective view showing a separator board.

Figure 12 is a perspective, bracketed view showing two sizes of water seal employed to seal the top of my sections.

Figure 13 is a perspective view showing a section of my hive.

Figure 14 is a perspective view showing a comb frame.

Figure 15 is a perspective view showing one type of approved queen excluders.

Referring to the drawings, throughout which like reference character indicate like parts, 16 designates generally the supporting frame, or table, of my hive. This I construct with two parallel sides as 18 and 19, each of which are pierced at regular intervals with mating holes as 20. The spacing of these holes should normally correspond to the length of my section. I have found it convenient to use normally six inch sections which will accommodate four comb frames 22 such as are illustrated in Figure 14. It will be apparent it is believed that the side of these sections might be varied either larger or smaller. The four frame section, however, is very convenient to use and is a recommended size. Suitable vertical posts, or legs, 24 are provided which support the frame and are usually braced therefrom. To complete the framework I have provided the substantial end members as 25 and 26. These again should be adequately braced or morticed into the side members so that when it is desired to tighten the sections into one unit these end members will provide adequate backing.

One of the features of my section-hive is that it will readily accommodate itself to varying needs and to further this faculty I have provided a number of different units which fit in between frames 18 and 19. These consist of the end boards 28 illustrated in detail in Figure 6; the separators, or parting boards, 30; the section, or comb holder units, themselves as 32, illustrated in Figure 13; covers for the sections, as 34, illustrated in Figure 10; and the pry bar 36 and ventilator boards 38 illustrated in Figures 7 and 9, respectively; and, finally, an iron bar 40 which is adapted to pass through the co-mating holes 20 in side frames 18 and 19. These bars provide the backing for wedges 42 which are used in conjunction with the pry bar 36 so as to press the various sections together and provide their snug engagement one with the other without jarring which has been found very detrimental in the culture of bees.

Adapted for use with the various parts of my section-hives are the conventional units illustrated in Figures 1, 3, 4, 14, and 15. These consist of the conventional hive members 44, the queen excluder 46, and the comb frames 22. These units are standard products which while forming no part of my present invention are elements found to be very desirable for use with my equipment.

*Assembling of hives*

In the assembly of a hive, or plurality of hives, following the teachings of my present invention, the basic unit is frame 16. Then at one end of the frame is placed an end board 28 and against this end board is placed a partitioning board 30. This board is normally provided with a groove 48 in its upper surface and with metal angle members 49 which serve to form frame holding plates. Groove 48 is adapted to receive one or the other of the water seals as 50 or 51, illustrated in Figure 12. It will be noted that members 28 and 30 are provided with a reduced lower body portion. The length of this portion should be sufficient so that it will easily slip in between side frame members 18 and 19 with the overhanging upper portions serving as a rest to lie on the upper surfaces of frames 18 and 19 and thereby secure the members in place.

Next in the assembly of the hive is to put into place as many sectional units 32 as may be required. In Figure 1 I have illustrated 3 such units as a basic assembly. This number may be varied, however, to fit the size of the colony being housed. It will be noted that the section members are provided with blocks as 53 and 54 which are recessed to provide handles for easily lifting the same and the blocks are so placed that the lower surfaces will engage the upper surface of frames 18 and 19 and definitely position the section, vertically, with respect to frame 16. One end of section 32 is cut away at 55 so as to provide a bee entrance. Further, the inner surfaces of each end are rabbeted out at 56 and 57 to form a rest for the outwardly extending lug portions 59 and 60 of the comb frame 22 so as to in turn definitely position these members with respect to the section.

As a covering for each section I provide the section top 34. This member is provided with two longitudinally extending grooves as 62 and 63 which answer the same purposes as groove 48 in member 30 and are adapted to receive one or the other of water seals 50 or 51.

Member 34 is provided at one end with a downwardly extending portion or separate block secured thereto illustrated at 65. The purpose of this block is so that it may serve to close the bee entrance 55 if it is used in the same sense as shown in Figures 10 and 13. If member 34 is reversed, however, there being no block on the opposite end of member 34, the bee entrance will be unrestricted.

As soon as the required number of sections have been inserted in frame 16 they are coupled by employment of the water seal members shown in Figure 12 which are of special width to engage their downwardly extending flanges in grooves of abutting section tops and thus provide a waterproof joint.

At the desired intervals the queen separators, or excluders, 46 are placed, as are illustrated in Figure 1, so that a desired size of store room may be arranged from which the queen is excluded and then, by the selection of a sufficient number of sections, and then a second queen excluder, a brood chamber of the desired size can be provided.

It will be noted that the extent of both the store room and brood chamber may be easily adjusted; they may be reduced or increased in size to meet conditions of the particular colony under consideration.

In the conventional construction, the hive boxes are stacked one upon the other to accommodate a colony of bees, the brood chamber being the lowest hive; and, normally, the bee inspector examines only the brood chambers, and this means that the upper hive boxes must be removed to facilitate such inspection; however, in my new section-hive the inspection may be limited to raising only the cover of the brood chamber, a very great saving in both time and labor.

Referring to Figure 1 it will be noted that I have provided a central brood chamber between the two partitioning boards, and store rooms on each side of the brood chamber. These three compartments when covered with members 34 will normally provide a hive assembly for a large bee colony. In Figure 1 I have further illustrated two conventional hive members 44. These can be placed on top of my store rooms and in turn be filled with comb frames and be used in the same manner as if they were used with the conventional hive equipment. They are illustrated in Figure 1 so as to show the flexibility, of my new improved hive parts, which enables a beeman in combination therewith to make use of much of the older equipment he may have on hand.

Inasmuch as frame 16 may be of any desired length it is reasonable to consider a hive so divided with separators 30 as to, in effect, provide a plurality of hives, the number being limited only by the length of the frame members. When, however, the desired number of units have been assembled, rod 40 is placed through opposite holes 20 in frame members 18 and 19 and wedges 42 are placed between the end separator board 30 and rod 40. At this point pry bar 36 is engaged between board 30 and rod 40 with the notch 36a engaging rod 40. This member being curved at its end as is illustrated in Figure 7, provides a natural camming type of leverage so that all the sections can be set up snugly to each other and the wedges 42 will normally then be forced down by steady pressure of the hand. In this way there is no jarring of the beehive to excite the bees, a condition which tends to general uneasiness that detracts from their efficiency.

As is illustrated by the dotted line at 67 in Figure 1, a covering as canvas, tar paper, or the like may be placed over my hive, with the hives 44 in place, or it may rest directly on top members 34. This covering may be engaged between the frame member 25 and end member 28 at one end, and under wedges 42 at the opposite end, so as to be held in place against wind pressure and provide an adequate shield to keep rain, snow, and the like off the hives. This also forms a very efficient covering for winter protection so that the heat of the various bee colonies will ke kept in the unit and, as a result, the bees will lose the minimum of their own generated heat.

It is also desired to point out that adequate provision has been made for ventilation. If hive members as 44 are used, they will not entirely fill the space of three sections so they will require filler pieces, or ventilator boards, 38. In Figure 1 these are shown in place on the right hand upper hive member 44 and removed on the left hand side so that ventilation can be provided at this point. Another point where ventilation is easily provided is by having an opening 55 in each section; these can be opened or covered merely by the positioning of section top 34 and, in this way, the amount of ventilation desired can be easily controlled.

To prevent the inroads of insects such as spiders, ants, earwigs, and the like, I have provided that each post 24 will rest in a large pan as 70 which in turn may be filled with water or other deterrent for insects.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. In a sectional bee-hive, the combination with a substantially horizontal frame having side bars and end bars, of a plurality of comb-holders arranged transversely of the frame and suspended on said side bars, removable means suspended on the side bars closing the outer sides of the two end holders, and means for pressing together, laterally, adjoining holders.

2. In a sectional bee-hive, the combination with a substantially horizontal frame having side bars and end bars, of a plurality of comb-holders arranged transversely in the frame, exterior end-blocks on said holders resting on said side bars, removable partition-boards closing the outer sides of the two end holders, and means for pressing together, laterally, adjoining holders.

3. In a sectional bee-hive, the combination with a substantially horizontal frame having side bars and end bars, of a plurality of open-side comb-holders arranged transversely in the frame, exterior end-blocks on said holders resting on said side bars, removable partition boards closing the outer sides of the two end holders, means for supporting said boards on the side-bars, and means for pressing together, laterally, adjoining holders.

4. In a sectional bee-hive, the combination with an open-frame having side bars and end bars, of a plurality of open-side and open-top comb-holders and means for supporting said holders on said side bars within the frame, removable means supported on the side bars for closing the outer sides of the two end holders, and means for pressing together, longitudinally of the frame, adjoining comb-holders.

5. In a sectional bee-hive, the combination with an open-frame having side bars and end bars, of a plurality of open-side and open-top comb-holders arranged transversely in the frame, means for supporting said holders on the side bars, removable covers having entrances and supported on the holders, removable means supported on the side bars for closing the outer sides of the two end holders, and means for pressing together, longitudinally of the frame, adjoining comb-holders.

6. In a sectional bee-hive, the combination with an open-frame having side bars and end bars, of a plurality of open-side and open-top comb-holders, exterior end-blocks on each holder resting on said side bars, removable covers having entrances and supported on the holders, removable partition boards having end-projections supported on the side-bars and closing the outer sides of the two end holders, and means for pressing together, longitudinally of the frame, adjoining comb-holders.

7. In a sectional bee-hive, the combination with an open-frame, a plurality of open-side comb-holders arranged in parallelism and supported transversely in the frame, and a pair of partition-boards supported in the frame and closing the outer sides of the two end holders, of a transversely extending presser bar supported in the frame adjacent one of said partition-boards, and means co-acting with said presser-bar and the adjacent partition bar for pressing together, laterally, adjoining comb-holders.

8. In a sectional bee-hive, the combination with an open-frame, a plurality of open-side comb-holders arranged in parallelism and supported transversely in the frame, and a pair of partition-boards supported in the frame and closing the outer sides of the two end holders, of a removable presser bar extending transversely of the frame and supported in holes in the frame adjacent one of said partition boards, and a wedge located between said presser bar and the adjacent partition boards.

9. In a sectional bee-hive, the combination with an open-side holder having two upright end walls, said end walls having inner grooves at their top free edges and one of said edges being cut away to form an entrance, of a reversible, removable, cover for the holder, said cover being adapted to seat on the top edges of the holder, a transversely extending strip at one end of the cover adapted to close the entrance, and supporting means at the other end of the cover whereby the entrance is left open.

10. In a sectional bee-hive, the combination with a pair of open-top comb-holders, and removable covers for said holders having longitudinally extending exterior grooves adjacent their adjoining edges, of a sealing strip having spaced longitudinally extending flanges engaged in said grooves, and end flanges on said strip overhanging the ends of the covers.

11. In a sectional bee-hive, the combination with an open frame having parallel side bars and parallel end bars, a plurality of open-side and open-top comb-holders, exterior means at the ends of said holders supported on said side bars, and removable partitions mounted within the frame and closing the outer sides of the two end holders, of means mounted in the frame and co-acting with one of said partitions for pressing together, laterally, the comb-holders, and means forming a water-seal for closing the joints between adjoining removable covers for said holders.

JOSEPH WISNIEWSKI.